H. GOTTSCHALK.
APPARATUS FOR MIXING DOUGH.
APPLICATION FILED APR. 6, 1915.
1,172,353.
Patented Feb. 22, 1916.
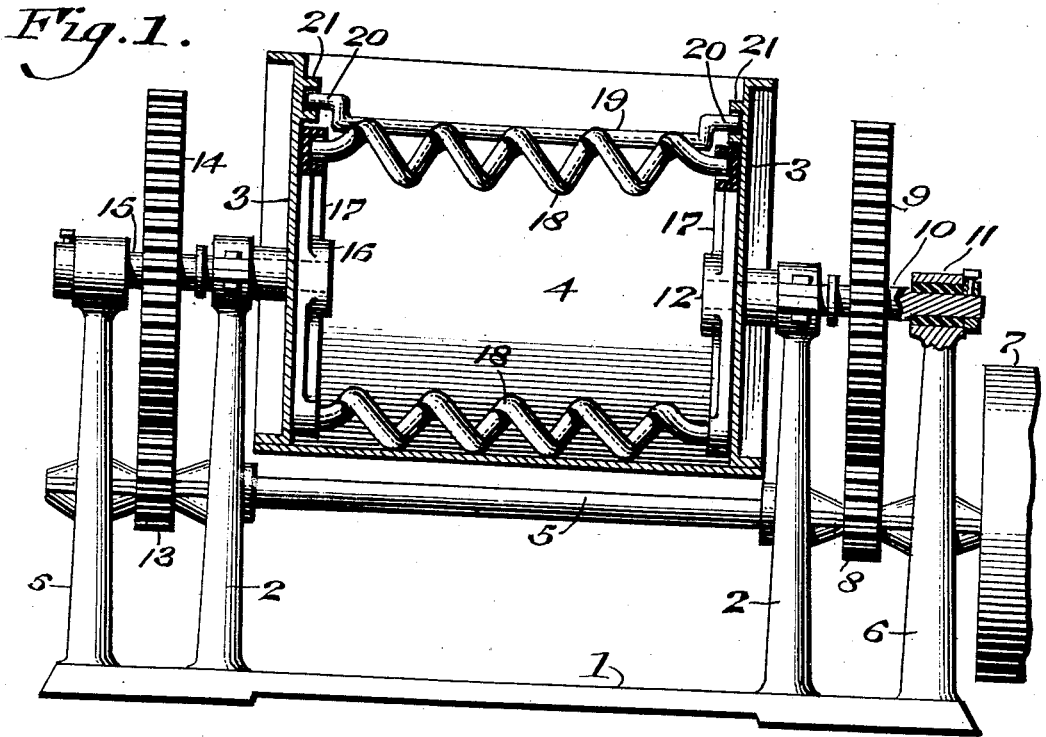
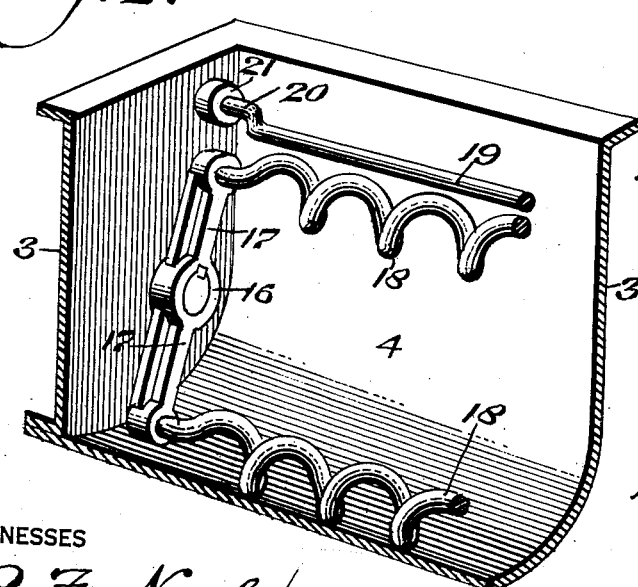
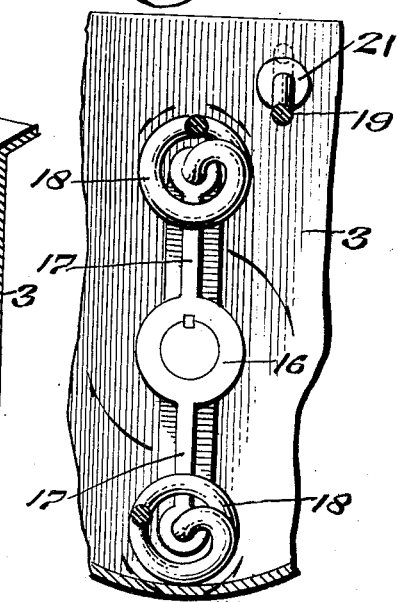
WITNESSES
P. F. Nagle
H. G. Dieterich
INVENTOR.
Hugo Gottschalk
BY Wiedersheim & Fairbanks
ATTORNEYS

UNITED STATES PATENT OFFICE.

HUGO GOTTSCHALK, OF BURNHAM, PENNSYLVANIA, ASSIGNOR TO GOTTSCHALK & CO., INC., OF REEDSVILLE, PENNSYLVANIA, A CORPORATION OF DELAWARE.

APPARATUS FOR MIXING DOUGH.

1,172,353.   Specification of Letters Patent.   Patented Feb. 22, 1916.

Application filed April 6, 1915. Serial No. 19,466.

*To all whom it may concern:*

Be it known that I, HUGO GOTTSCHALK, a citizen of the United States, residing at Burnham, in the county of Mifflin, State of Pennsylvania, have invented a new and useful Apparatus for Mixing Dough, of which the following is a specification.

My invention relates to the method of and apparatus for mixing dough and has for an object to provide means for revolving the mass of dough and for imparting an endwise or lateral movement thereto, whereby the material is worked evenly and uniformly to produce a dough of high baking value and quality.

It has for a further object to provide means for stretching and pulling the dough during its revolution in the machine.

It further consists of other novel features, all as will be hereinafter set forth.

For the purpose of illustrating my invention, I have shown in the accompanying drawings, one form thereof, which is at present preferred by me, and by means of which my method may be carried out, and the same has been found in practice to give satisfactory and reliable results, although, of course, it is to be understood that the various instrumentalities of which my invention consists can be variously arranged and organized and that my invention is not limited to the precise arrangement and organization of these instrumentalities as herein shown and described.

Figure 1 is a partial side elevation, partial sectional view, of an apparatus for mixing dough embodying my invention, and by means of which my method may be carried out. Fig. 2 is a sectional perspective view of a portion of the device, in detached position. Fig. 3 is a sectional view on the line $x$—$x$ Fig. 1.

Similar numerals of reference indicate corresponding parts in the figures.

Referring to the drawings:—1 designates the base or frame of a dough mixing machine embodying my invention having the standards 2 to which is suitably journaled the mixing receptacle 3 forming the mixing chamber 4 and which may be of any suitable or desired construction and may be mounted upon the standards 2 in any suitable manner, it being understood that means may be provided for tilting the receptacle, but as the same forms no part of the present invention, I have omitted these parts for the sake of clearness. Journaled in the standards 2 is the power shaft 5 which is also journaled in the uprights 6, and to which shaft power is applied in any suitable manner as by a pulley 7.

8 designates a gear on the power shaft 5 meshing with a gear 9 connected with the countershaft 10, which has one end rotatable in a journal 11 and which extends through a suitable opening in one of the standards 2 and through one end of the receptacle 3 and has a hub 12 suitably connected therewith, as by a key.

13 designates a second gear on the power shaft 5 which meshes with the gear 14 connected with a countershaft 15, which is journaled in one of the uprights 6 and extends through suitable openings in one of the standards 2 and passes through an opening in the opposite end of the receptacle 3 and has a hub 16 suitably connected therewith, as by a key. As will be seen, the hubs 12 and 16 have the members 17 extending therefrom upon opposite sides of the point of connection with the countershafts 10 and 15, although any number of said extending members may be employed, as desired. Extending between the members 17 are the mixing arms or agitators, which, as here shown, consist of spiral rods 18, which are rotatably mounted in the members 17 and extend laterally across the receptacle 3. The mixing arms are adapted to revolve with the members 17 in the chamber 4 at points removed from the axis of revolution, and I preferably form the spiral arms in such a manner that the same will contact with the walls of the chamber 4 in order that it will assist in imparting a rotative movement to the arms during their revolution in the chamber, the rotation being also assisted by the mass of dough or material within the chamber.

The operation of the device will be readily apparent. The material to be mixed, such as the dough, having been placed in the chamber 4 of the receptacle 3, and power being applied to the shaft 5, the mixing arms will be revolved around in the chamber 4 through the action of the gears 8 and 13 meshing with the gears 9 and 14, respectively, which are carried by the countershafts 10 and 15. By reason of the revolution of the mixing arms 18, the dough will be caused to revolve properly in the chamber 4, while at the same time, owing to the rotation of the said spiral arms, an endwise movement laterally in the chamber 4 will be imparted to the dough which will provide for a proper mixing of the same. It will, of course, be understood that the mixing arms may be revolved in one direction in the chamber 4 for a certain time and may then be reversed and caused to revolve in the opposite direction, if desired.

From the above, it will be understood that I have devised a method of mixing dough, which consists in revolving the mass in a receptacle and in imparting endwise or lateral movement to the dough during the revolution thereof, the endwise movements taking place at different points in the mass and spaced from the axis of revolution.

I have found, in some instances, that it is of advantage to provide for spreading and pulling or stretching of the dough during its revolution in the chamber 4, and for this purpose, I have provided a striking bar, which is situated within the chamber 4, but located out of the path of movement or revolution of the mixing arms 18.

19 designates the striking bar, which I have mounted in the chamber for yielding movement, and as here shown, it consists of a crank arm provided with the offset portions 20, which are rotatably mounted in the journals or bosses 21 carried by the inner wall of the receptacle 3, it being seen that by reason of this construction, the striking bar 19 is swingingly mounted in the chamber 4, that is for yielding movement, and can rotate, if necessary, in the journals or bosses 21. It will be understood that as the dough is carried around by the mixing arms, portions of the same will be thrown against the striking bar 19, which will yield sufficiently to prevent sheering off of the portion of dough which strikes the same, but will hold the same for a certain length of time to cause a spreading or stretching of the dough as it revolves or is carried around in the chamber 4 by the movement of the mixing arms. This action aids considerably in the proper mixing and kneading of the dough and enables the completion of the mixing in a shorter time than heretofore.

I have sometimes found in practice, when the striking bar is not used and where the dough is somewhat stiff, that it will be carried around by the mixing arms and it is with considerable difficulty that it is caused to be kneaded or mixed, but where the seriking arm is employed, as the dough is carried around by the mixing arm and is caused to engage with the striking arm, it is so spread and pulled that it quickly assumes the proper consistency, as will be evident.

It will now be apparent that I have devised a complete unitary structure, simple in construction, and efficient in operation, and that I am enabled, not only to accomplish the desired mixing operation, but the same may be completed in less time than is ordinarily consumed.

It will now be apparent that I have devised a novel and useful method of and apparatus for mixing dough, which embodies the features of advantage enumerated as desirable in the statement of the invention and the above description, and while I have, in the present instance, shown and described a preferred embodiment thereof which has been found in practice to give satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:—

1. A non-rotatable mixing machine, comprising a mixing chamber and a rotatably mounted spiral member vertically revoluble in the chamber and extending substantially parallel to the axis of revolution, and adapted to engage the material to impart an endwise movement thereto during the revolution.

2. A non-rotatable mixing machine, comprising a mixing chamber, a rotatably mounted member vertically revoluble in the chamber and having means for engagement with the material to impart an endwise movement thereto during the revolution, and means for actuating said member.

3. A device of the character stated, comprising a non-rotatable mixing chamber, a plurality of rotatable elements vertically revoluble in the chamber in the same direction and extending substantially parallel to the axis of revolution, and said elements having means for imparting an endwise movement to the material as they are revolving in the chamber.

4. A non-rotatable mixing machine, comprising a mixing chamber and a plurality of rigid spiral cross bars vertically revoluble within the chamber and rotatably mounted to impart an endwise movement to the material parallel to the axis of rotation as they are revolving in the chamber.

5. A non-rotatable mixing machine, comprising a mixing chamber, a plurality of rigid spiral cross bars, means for rotatably supporting the same within the chamber, means for actuating the supporting means to vertically revolve the bars within the chamber, the path of revolution being spaced from and parallel to the axis thereof.

6. A mixing machine, comprising a mixing chamber, a mixing arm mounted for revolution within the chamber, and a loosely mounted striking bar offset from its point of connection with the wall of the mixing chamber to provide a swinging movement out of the path of revolution of the arm.

7. A mixing machine, comprising a mixing chamber, an agitator mounted for revolution within the chamber, and a crank arm, forming a striking bar, loosely mounted for swinging movement within the chamber out of the path of movement of the agitator.

8. A mixing machine, comprising a mixing chamber, a mixing arm mounted for revolution within the chamber, and a striking bar supported for yielding movement within the chamber out of the path of revolution of the arm and adapted to engage the dough in its revolution, to stretch and pull the same.

HUGO GOTTSCHALK.

Witnesses:
GUSTAVE JARETSKY,
NATHAN SKLAR.